Jan. 4, 1955        C. R. BLYTH        2,698,910
SLOTTED ARMATURE FOR ELECTRIC MOTORS
Filed March 19, 1952
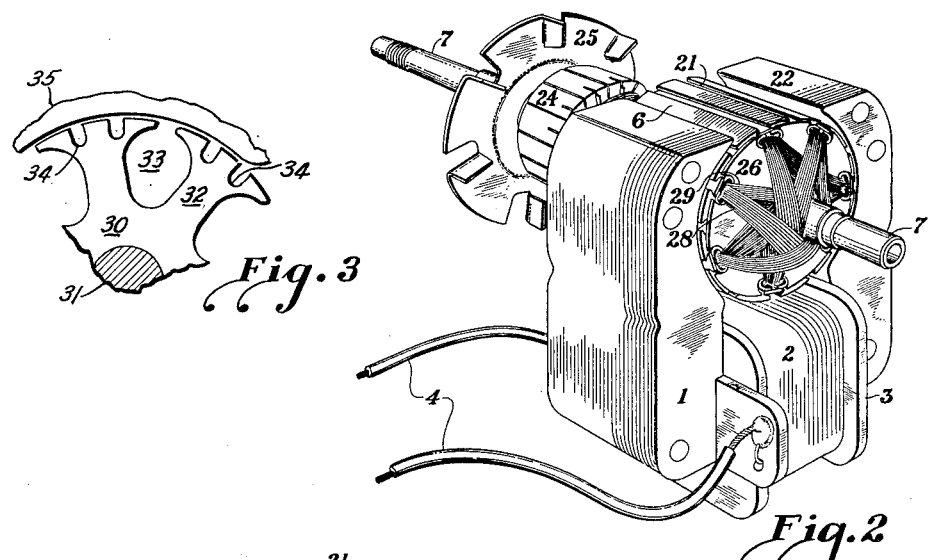
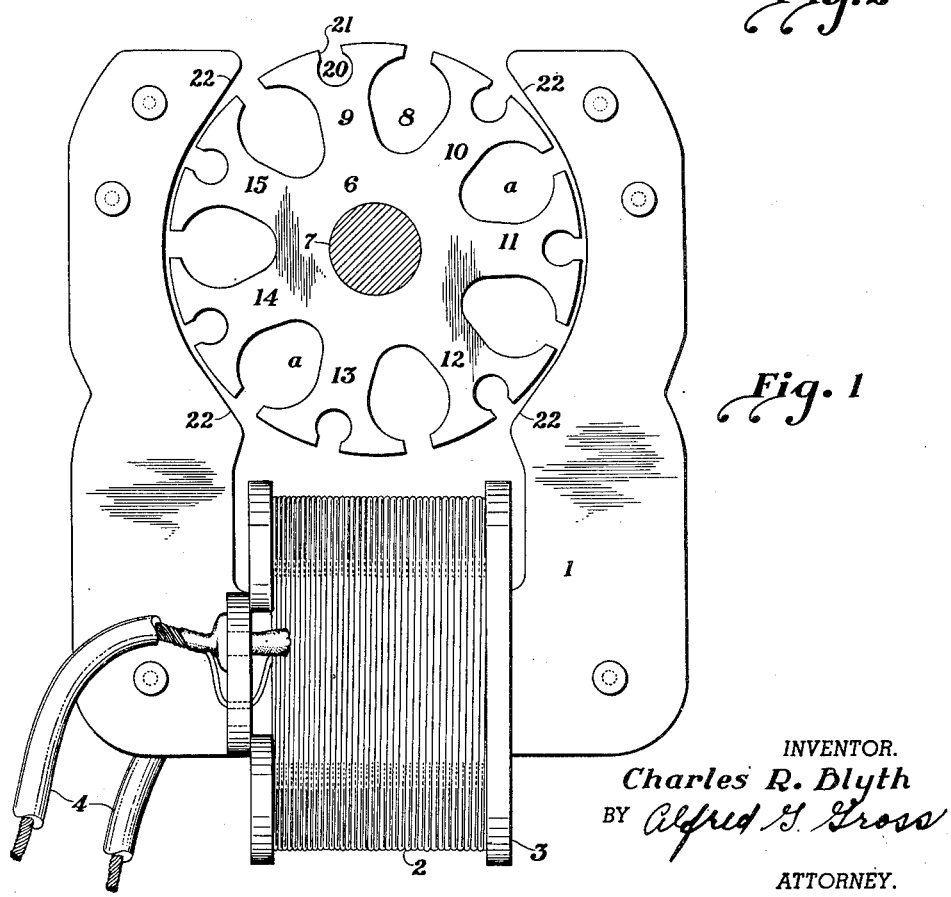
INVENTOR.
Charles R. Blyth
BY Alfred G. Gross
ATTORNEY.

United States Patent Office 2,698,910
Patented Jan. 4, 1955

2,698,910
SLOTTED ARMATURE FOR ELECTRIC MOTORS

Charles R. Blyth, Canton, Ohio, assignor to The Hoover Company, North Canton, Ohio, a corporation of Ohio Application March 19, 1952, Serial No. 277,503

4 Claims. (Cl. 310—51)

The present invention relates to electric motors and particularly to armature structures for electric motors in which there is dissymmetry between the field poles and armature teeth producing a dissymmetry in the motor field flux pattern.

Design considerations frequently dictate electric motor structures in which the arc of the armature embraced by a single field pole includes a fractional number of armature teeth. A common example of the foregoing is represented by bipolar motors having an odd number of armature teeth and winding slots. Motors embodying the foregoing relationships are characterized by a non-symmetrical flux distribution which produces an oscillating radial pull on the armature resulting in excessive bearing wear and objectionable noise which is aggravated when the motor starts under load.

A particular object of the invention is to provide a motor armature permitting the use of a toothed structure in the armature having an unsymmetrical relation to the motor field and provided, according to my invention, with means which will substantially suppress undesired radial pulls and field distortion productive of noise and undue bearing wear.

Other objects and advantages of the invention will become apparent as the description proceeds when taken in connection with the accompanying drawing, wherein:

Figure 1 is an elevational view of a motor field structure and armature with the armature windings removed in order to show my invention clearly; and Figure 2 is a perspective view of a small bipolar motor, field structure and complete armature structure embodying my invention; and Figure 3 is a fragmentary view similar to Figure 1 of a motor structure with each armature tooth separated into three segments.

Referring now to the drawing in detail and first to Figure 1 thereof, the motor illustrated comprises a laminated iron field structure 1 of the unicoil, bipolar type. An energizing coil 2 is wound about a spool 3 of insulating material mounted on the bight portion of the field 1. Suitable leads 4 provide for energization of the windings 2. The armature is constructed of a plurality of laminations of which one lamination 6 is shown in Figure 1 mounted upon an armature shaft 7. It will be observed that the armature lamination 6 is provided with seven winding slots, designated 8, which thus form seven projecting armature teeth numbered 9 through 15 inclusive. The windings placed on such an armature would usually have a four-slot pitch; that is, one coil will be wound, for example, in the slot designated a—a for a desired number of turns and will then advance one pair of slots, continuing the process until each of the winding slots contains two coils, producing fourteen coils in all. Each coil will be connected to a separate bar of a fourteen bar commutator.

In the motor illustrated in Figure 1, the poles of the field are symmetrical but bear an unsymmetrical relation to the armature because of the odd number of slots and teeth therein. For example, in position of the parts shown in Figure 1, the armature teeth 14 and 15 are directly beneath the left hand pole and are completely embraced thereby. The armature tooth 11 and approximately one-half each of the armature teeth 10 and 12 are embraced under the right hand pole of the yoke 1. This introduces an imbalance in the motor, producing an oscillating side thrust and a non-symmetrical field distortion as the various teeth move into and out of direct influence of the field pole. The combined effect of non-symmetrical distortion of the field on opposite sides of the armature as the various armature teeth pass into and out of direct influence of a particular pole and the varying amounts of armature iron most intimately associated with the various poles produces oscillating side thrusts which are productive of bearing wear and give rise to objectionable noises. Such noises are present under all operating conditions but are extremely bad when the motor is starting under load.

I have found that the introduction of small, half-round dummy slots or grooves 20 in the center of each armature tooth substantially completely eliminates the foregoing objectionable conditions. Considerable latitude is allowable in the shape and depth of the small slots 20. I have found the circular shape provided with a narrow neck 21 opening to the exterior of the armature surface to be particularly desirable. Such a shape permits the motor to be balanced readily either by inserting circular section lead weights in the slots 20, by drilling in the bottom of the slots or by milling the edges of the throats 21 thereof as may be desired.

The size of the slots 20—21 is not highly critical; however, for best results, they should be of a size to permit or provide a field flux air gap interruption approaching that provided by one of the winding slots. For this purpose, the slots 20—21 may be shallow, one-third to one-fourth the depth of the winding slots for satisfactory operation. It is also desirable, but not essential, that the peripheral span of the throats 21 approximate the peripheral span between adjacent armature teeth.

Each of the slots 20 divides one armature tooth into two segments. With the position of the parts illustrated in Figure 1, all of the segments of the armature teeth 14 and 15 are within the embrace of the left hand field pole. Both segments of the armature tooth 11 and one segment of each of the armature teeth 10 and 12 are within the embrace of the right hand pole of the field 1. Thus each pole piece completely embraces four tooth segments. The segments of tooth 9, one segment of tooth 10, the two segments of tooth 13 and one segment of the tooth 12 are in the neutral zones between the ends of the field pole. This is a substantially symmetrical structure with reference to the field structure and has been found to produce practical symmetry with respect to lateral pull on the armature by the field structure and practically symmetrical field distortion at the chamfered tip portions 22 of the field poles.

The perspective view of Figure 2 illustrates the manner in which the armature is wound. As there shown, a commutator 24, which will have fourteen commutator bars as mentioned hereinabove, is mounted on the shaft 7 adjacent a ventilating fan 25 also carried by that shaft. The other end of the armature is provided with an insulating plate 26 which is slotted to conform to the winding slots of the armature laminations only. This view also illustrates the manner in which two double coils, such as coils 28 and 29, are wound in each of the armature slots. It will be observed that the two double coils 28 and 29 lies in a common slot on the left hand side of the armature as viewed in Figure 2 but lie in different slots on the opposite side thereof. This is the usual convention adopted in order to avoid too great a build-up of end connections around the center of the armature.

In an armature constructed as hereinabove described, balancing may be accomplished by inserting weights in the quieting slots 20, by milling the bottoms of the slots or the edges of the slot throats 21, or by drilling into the armature body through the bottom of the slots 20. These operations do not interfere with the quieting and side thrust reducing functions of the quieting slots in the armature teeth.

The invention has been described above with reference to a bipolar field and an armature having an odd number of teeth each centrally divided by a single quieting slot, but the invention is not limited to these relationships. The invention is applicable generally to motors in which the arc of a single field pole is not equal to the arc subtended by an integral number of armature teeth. In such cases, each armature tooth is provided with one or more quieting slots dividing each tooth into one or more segments as may be required to fit an integral number of armature tooth segments into the field pole arc.

As an example of the foregoing, the motor of Figure 3 is provided with three segments per tooth. Since this form of the invention differs from Figures 1 and 2 only with respect to the number of tooth segments and the relation of pole arc to tooth arc, only a fragmentary view illustrating these relations is included.

In Figure 3, the laminations 30 are secured to shaft 31 in the usual manner. The laminations are provided with radially projecting teeth 32 forming winding slots 33 therebetween. Each tooth 32 is provided with a pair of dummy slots 34 having a depth greater than their peripheral span and a width approximating the peripheral width of the winding slots 33. The spacing of the slots 34 in each tooth is such as to divide the peripheral span of the tooth into three equal segments. As noted in connection with Figures 1 and 2, the half round slot shape there shown is desirable for balancing purposes but not essential or critical. Where, as in Figure 3, the number of slots is large, straight slots are preferred to avoid excessive weakening of the tooth structure.

An arrangement as shown in Figure 3 is desirable for example where the pole piece 35 of a bipolar field, used with a seven winding slot armature, subtends an arc of approximately 85° or 120°. Each tooth of a seven tooth armature subtends an arc of approximately 51° and each tooth segment of a double slotted tooth subtends an arc of approximately 17°. Hence, each pole of 85° arc will embrace five such tooth segments and each pole of 120° arc will embrace seven such tooth segments.

While the invention has been illustrated and described in detail herein, it is not to be limited thereto but various changes may be made in the construction, design and arrangement of parts without departing from the spirit of the invention or the scope of the appended claims.

I claim:

1. In an electric motor, a field structure having a plurality of poles, an armature provided with a plurality of projecting tooth members defining winding slots therebetween, armature windings in said slots, and grooves formed in each of said tooth members subdividing the same into a plurality of tooth segments between each of said slots, said grooves being so positioned that each of said poles has an arcuate span equal to an integral number of said segments.

2. In an electric motor, a field structure having a plurality of poles, an armature provided with a plurality of radially projecting spaced teeth forming axially extending winding slots in the circumferential portion of said armature, armature windings in said slots, axial grooves formed in said teeth subdividing the same into a plurality of tooth segments, each of said grooves having a peripheral width approximating the peripheral width of a winding slot and a depth exceeding their width, and said grooves being so positioned that the arc length subtended by each of said poles equals the arc length subtended by an integral number of tooth segments.

3. In an electric motor, a bipolar field structure, an armature having an odd number of teeth forming winding slots therebetween, armature windings in said slots, and a groove formed in the central portion of each of said teeth extending inwardly of said armature forming a field flux interrupting and distorting break in the armature similar to the field flux interrupting and distorting break formed by a winding slot.

4. In an electric motor, an armature provided with a plurality of radially projecting teeth defining winding slots therebetween, armature windings in said slots, a field structure having a plurality of field poles embracing the armature wherein the peripheral span of each field pole embraces a non-integral number of armature teeth, each armature tooth being axially grooved to subdivide each tooth into a plurality of tooth segments of equal peripheral span approximately equally spaced peripherally of the armature and each field pole having a peripheral span sufficient to embrace an integral number of armature tooth segments.

References Cited in the file of this patent

FOREIGN PATENTS 39,459    Sweden _____ Sept. 29, 1915